United States Patent [19]
Suganuma

[11] Patent Number: 6,145,058
[45] Date of Patent: Nov. 7, 2000

[54] DEVICE AND METHOD FOR CONTROLLING WRITE-BACK OF DATA IN A CACHE MEMORY CONNECTED TO A STORAGE

[75] Inventor: Shigeru Suganuma, Tokyo, Japan

[73] Assignee: NEC Corporation, Tokyo, Japan

[21] Appl. No.: 09/062,654

[22] Filed: Apr. 20, 1998

[30] Foreign Application Priority Data

Apr. 18, 1997 [JP] Japan .................................... 9-116133

[51] Int. Cl.⁷ .................................................. G06F 12/08
[52] U.S. Cl. ............................ 711/134; 711/113; 711/143
[58] Field of Search .................................... 711/113, 133, 711/134, 136, 143

[56] References Cited

U.S. PATENT DOCUMENTS 5,519,831  5/1996  Holzhammer ............................. 714/22
5,636,355  6/1997  Ramakrishnan et al. ............... 711/143

FOREIGN PATENT DOCUMENTS 3-172946    7/1991   Japan .
5189316     7/1993   Japan .
52774779   10/1993   Japan .

*Primary Examiner*—Reginald G. Bragdon
*Attorney, Agent, or Firm*—Foley & Lardner

[57] ABSTRACT

A control mechanism of a disk controller measures read and write hit rates for each data item in the cache memory. The intended storage location on a disk of each data item in the cache is compared to the current head position of a recording/reproduction head on the disk and the distance therebetween is calculated. A selector selects for write-back data from among the data items stored in the cache in accordance with the read hit rate, write hit rate and the calculated distance. The selector also selects an item for write back based on a longest predicted data transfer time.

24 Claims, 10 Drawing Sheets

DEVICE AND METHOD FOR CONTROLLING WRITE-BACK OF DATA IN A CACHE MEMORY CONNECTED TO A STORAGE

BACKGROUND TO THE INVENTION

1. Field of the Invention

The present invention relates to a storage control device wherein the write-back method is adopted, and in particular to method of selecting data in the cache memory which is to be written to the storage.

2. Description of the Related

The performance of a storage control device is determined by the response time to data read and data write requests from the host computer. Generally speaking, the data transfer rate with the higher-level device (host) connected to the storage control device is higher than the data transfer rate with the storage which is also connected to it. The storage control device is equipped with a cache memory in order to improve its performance. In this case, it is possible for the data transfer rate between the cache memory and the high-level device to attain a value which is close to the theoretical threshold value of the transfer rate between the storage control device and the higher-level device.

There are two methods of using the cache memory, namely write-through and write-back. The write-through system permits use of the cache memory alone only for read requests from the higher-level device. In the case of write requests, both the cache memory and the storage are involved simultaneously. The write-back system, on the other hand, permits use of the cache memory alone for both read and write requests from the higher-level device. In the write-back system, the higher-level device is notified when write data from the high-level device to the storage has been written to the cache memory. This data is then written from the cache memory to the storage (write-back) asynchronously with the writing of data from the higher-level device to the cache memory. This means that the write-back system facilitates the speedy processing of write requests from the higher-level device.

Here, the process of writing the data from the cache memory to the storage is referred to as 'write-back'. The write-back system, is one whereby data stored temporarily in the cache memory is 'written back'. When there is no more space area in the cache memory, or when the space area has decreased to less than a predetermined size, the storage control device executes write-back processing. At such times, the question of which of the data present in the cache memory to select as write-back data is an important factor in determining the performance of the storage control device in a write-back system.

A typical system for selecting write-back data is the LRU (least recently used) method. In the LRU method, the data which has been present in the cache memory for the longest time without being subject to input or output is written back to the storage. This allows the more frequently accessed data to remain in the cache memory, thus making it easier to amend the cache hit rate. An example of a storage control device which uses the LRU method to select write-back data is provided by Japanese laid open patent publication A-3-172946, Unfortunately, the storage comprises a magnetic storage which has an overhead time known as the seek time and calculated in unite of milliseconds. If a long seek time is required during write-back of data selected by the LRU method, it is either impossible for any other processing to be executed during this seek time, or for data to be recorded because the write-back is still in progress, and this detracts from the performance of the magnetic storage control devise.

SUMMARY OF THE INVENTION

It is an object of the present invention to provide a device for controlling a magnetic storage, and method thereof, which allows the seek time to be reduced while utilizing the cache memory to the utmost in order to improve the data transfer rate.

It is a further object of the present invention to provide a device for controlling a storage, and method thereof, which allows the small capacity of the cache memory to be utilized with the utmost efficiency.

It is a yet another object of the present invention to provide a device for controlling a storage, and method thereof, which allows write-back data to be selected by means of simple calculations in a computer system wherein data is read and written to and from predetermined locations on a magnetic disc.

Thus, when selecting write-back data, the present invention takes into account the seek time of the magnetic storage for each item of data. More specifically, it is a device for the write-back of data stored within a cache memory connected to a storage, having a use rate calculator which serves to calculate the rate of use of data stored in the cache memory, a location detector which specifies the intended location in the storage for data stored in the cache memory, a head position memory which stores the current position of the recording/reproduction head of the storage, a distance calculator which serves to calculate the difference between the intended location in the storage for each item of data stored in the cache memory and the current position of the head, and a selector which serves to select write-back data from among data stored in the cache memory in accordance with differences in the rate of use and store location of each item of data.

It ascertains the intended storage location in the storage for data which is stored in the cache memory, and calculates the difference between this and the current storage head position. It then selects write-back data on the basis of this difference and the hit rate of the relevant data. In this manner the present invention seeks to attain the abovementioned object.

In one embodiment the selector has a calculation mechanism which serves to calculate the predicted data transfer rate for each item of write-back data, and a selection mechanism which serves to select as write-back data such data as has the longest predicted data transfer time. More precisely, these mechanisms are realized with the aid of the CPU and programs or theoretical circuits. They allow write-back data to be calculated in accordance with the predicted data transfer rate at write-back of each item, so that the most suitable write-back data may be selected on the basis of both seek time aid hit rate. This write-back process is implemented, for instance, when a cache memory miss has occurred.

In another embodiment the selector has (A) a use rate calculation mechanism which calculates the virtual rate of use on the basis of (i) the amount of virtual past cache hit data after deleting from the total amount of cache hit data the amount of data which it is sought to write back, and (ii) the total amount of data transferred between the host and the storage, and (B) a selection mechanism which selects write-back data from among such data as causes this virtual rate of use to decrease, the difference between the current position of the head and the store location of said write-back data in the storage as calculated by means of the distance calculator being small. These mechanisms are realized with the aid of the CPU and programs or theoretical circuits. Here, if the same access as before continues, a plurality of items of data with a low hit rate is selected, and data with a small difference between the current position of the head and the store location in the storage is selected from among this as write-back data. This makes it possible to select as write-back data such data as lengthens the mean transfer time.

DESCRIPTION OF THE PREFERRED EMBODIMENTS

Figure 1:
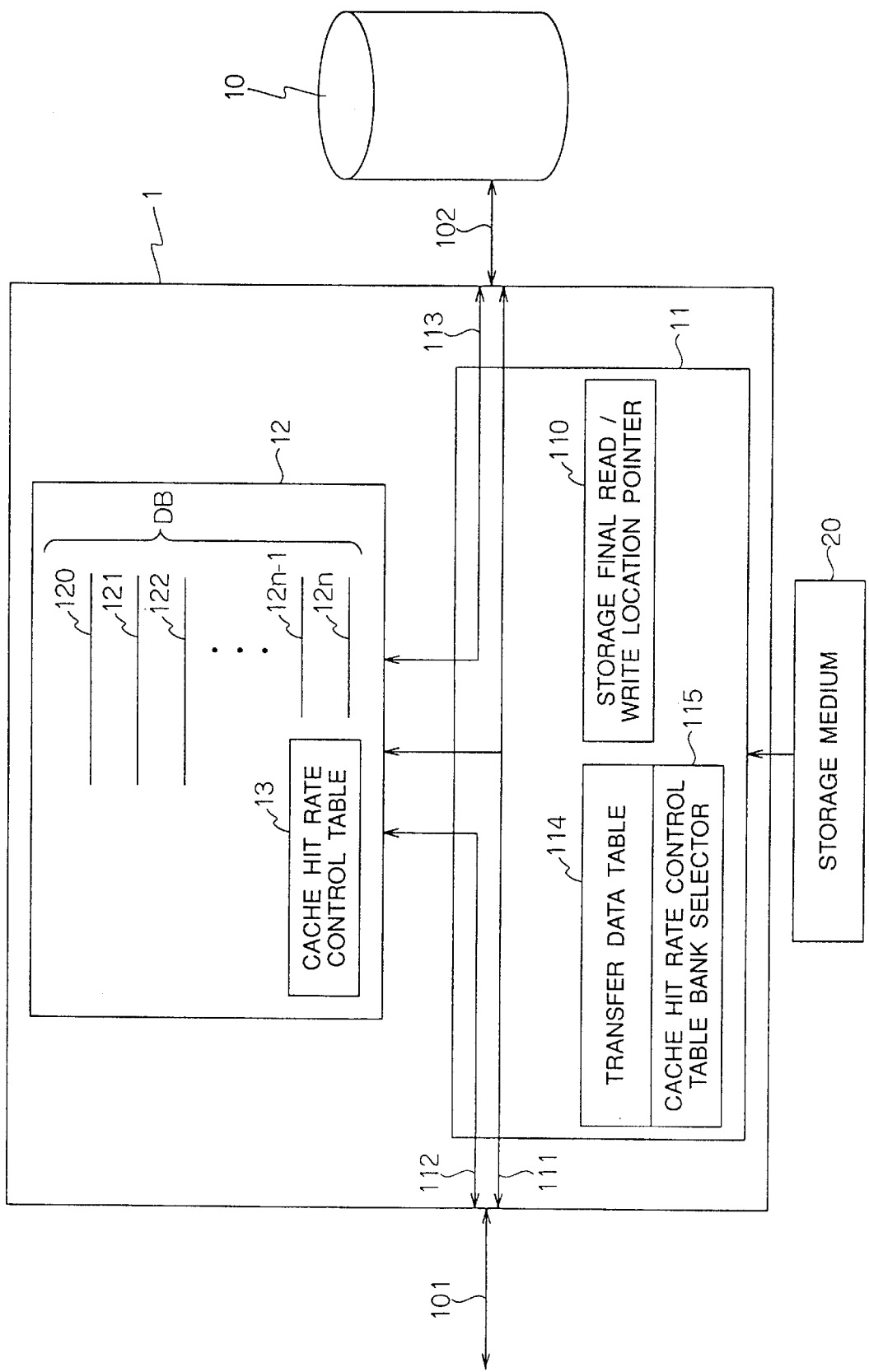
FIG. 1 is a schematic diagram which serves to illustrate an example of a storage control device to which the present invention has been applied.

FIG. 1 is a schematic diagram which serves to illustrate an example of a storage control device to which the present invention has been applied. The storage control device in this example is connected by way of an higher-level connecting bus 101 to an higher-level device (eg a central processing unit or host computer) which is not shown in the drawing. It is also connected by way of a lower-level connecting bus 102 to a storage (eg magnetic disk drive) 10. It should be added that in the drawing it is connected to only one storage, but it may also be connected to a plurality thereof.

Within the storage control device 1 are contained a control mechanism 11 comprising a CPU, memory and other elements, together with a cache memory 12. There are also transfer buses such as a cache hit transfer bus 11, cache hit transfer bus 112 and cache memory write-back transfer bus 113.

The cache memory 12 has a plurality of data blocks 120–12n, each of which holds a copy of part of the data which is stored in the storage 10. The control device 11 makes use of one of the data transfer buses in accordance with details of requests from the host and the status of the cache memory 12 in order to control data transfer as described below.

If there is a data read request from the host and a resulting read hit in the cache memory 12, the cache hit transfer bus 112 is used to transfer the relevant data from the cache memory 12 to the host by way of the higher-level connecting bus 101, Meanwhile, if there is read miss, the cache miss transfer bus 111 is used to read the relevant data from the storage 10 by way of the lower-level connecting bus 102 and store it in a vacant data block of the cache memory 12, while also transferring it to the host by way of the higher-level connecting bus 101.

On the other hand, if there is a data write request from the host and a resulting write hit in the cache memory 12, the cache hit transfer bus 112 is used to write the data to the relevant data block, at which time the host is advised of the completion of the write process. Meanwhile, if there is write miss, the cache hit transfer bus 112 is used to write the write data to a vacant data block, at which time the host is advised of the completion of the write process. The data is written to the storage 10 asynchronously with the foregoing write process.

There follows an explanation concerning the selection of write-back data.

The mean data transfer rate L' of the storage control device with the host may be represented using the reciprocal mean data transfer rate 1/L' as follows.

$$1/L' = (RH/L) + \{R(1-H)/M\} + \{(1-R)T/L\} + \{(1-R)(1-T)/M'\} \quad (1)$$

L: Data transfer rate with host
R: Read ratio
Read hit rate
T: Write hit rate
M: Mean data transfer rate with storage
M'; Mean data transfer rate with storage at write miss The first item (RH/L) on the right-hand side of formula (1) represents the transfer time at read hit, the second item $\{R(1-H)/M\}$ transfer time at read miss, the third item $\{(1-R)T/L\}$ transfer time at write hit, and the fourth item $\{(1-R)(1-T)/M'\}$ transfer time at write miss.

At write-back of data which is in the cache memory, the read hit rate H, write hit rate T, and data transfer rate M' with the storage at write miss change. Thus, it is assumed that the mean data transfer rate L' of the storage control device with the host will change. The degree of this change varies according to the write-back data. In the present embodiment, the write-back data selected is basically that which will allow the mean data transfer rate L' of the storage control device with the host thereafter to assume its maximum anticipated value.

Formula (1) may be rearranged as follows.

$$1/L' = \{RHM + R(1-H)L + (1-R)TM + (1-R)(1-T)LM/M'\}/LM \quad (2)$$

In formula (2), the data transfer rate L with the host and the mean data transfer rate M with the storage are parameters intrinsic to the storage control device, and it is possible to regard the denominator LM as a constant. The numerator may be replaced with S, as follows.

$$S = RHM + R(1-H)L + (1-R)TM + (1-R)(1-T)LM/M' \quad (3)$$

S in formula (3) is in inverse proportion to L' in formula (2). Thus, when the value of S diminishes, the mean data transfer rate L' increases, and the mean transfer time (1/L'), becomes shorter. Consequently, when it comes to selecting the optimum write-back data, it is best to extract data which influences the read hit rate H, write hit rate T, and data transfer rate M' with the storage at write miss in such a manner that the value of S is as small as possible.

The data transfer rate M' with the storage at write miss may be estimated roughly in the following manner.

$$M'=D/\{Wr+(Cd/Cm)Ws+XD\} \quad (4)$$

D: Data length
Wr: Rotational delay time of the storage
Ws: Mean seek delay time of the storage
Cd: Difference to the requisite cylinder
Cm: Half the total number of cylinders
X: Actual rate of rotation of the storage The first item (Wr) on the right-hand side of formula (4) represents rotational delay time, the second item {(Cd/Cm)Ws} seek delay time, and the third item (XD) actual data transfer time.

If the data length for each read and write is fixed, the only variable in formula (4) becomes the difference to the requisite cylinder Cd. If the data transfer rate per unit data length d0 is sought, formula (4) may be amended in the following manner.

$$M'=1/(W0+CdWm) \quad (5)$$

WC: (Wr+XD0)/d0 . . . except seek delay time
Wm: Ws/(Cm×d0) . . . seek delay time per cylinder
Substituting formula (5) for formula (3) gives the following.

$$S=RHM+R(1-H)L+(1-R)TM+(1-R)(1-T)LM(W0+CdWm) \quad (6)$$

Consequently, as write-back data it is best to select data which influences the read hit rate H and write hit rate T in such a manner that the value of S in formula (6) is as small as possible, and has a that sort of difference Cd until the relevant cylinder. M, L, W0 and Wm in formula (6) are parameters intrinsic to the storage control device, and R is determined in accordance with the frequency of read/write requests from the host.

There follows a detailed description of the method of selecting as write-back data such data for which it is possible to minimise the value of S in formula (6).

In formula (6), the read ratio R, read hit rate H and write hit rate T are represented in the form of probabilities. The actual values of R, H and T may be calculated in accordance with the formulae Listed below, in which case a suitable amount of data Nd is determined, followed by the amount of read data Nr when a data read request from the host was executed for this amount of data Nd only, the amount of read hit data Hd within this amount of read data Nr, the amount of write data Nw, and the amount of write hit data Td within this amount of write data Nw.

$$R=Nr/Nd \quad (7)$$

$$H=Hd/Nr \quad (8)$$

$$T=Td/Nw \quad (9)$$

Nr: Amount of read data within the amount of dana Nd
Hd: Amount of read hit data within the amount of read data Nr
Td: Amount of write Lit data within the amount of write data Nw $$(Nw=Nd-Nr)$$

When a certain item of data j which is present in the cache memory has been written back, no read hit or write hit for that item of data j can be expected thereafter. Thus, when considering the amount of read hit data Hd within the amount of read data Nr, it is necessary to subtract an amount of read hit data (Hj) equivalent to the item of data j. In the same way, when considering the amount of write hit data Td within the amount of write data Nw, it is necessary to subtract an amount of write hit data (Tj) equivalent to the item of data j. Now, let H', T' represent Hd, Td less Hj, Tj as in formulae (10), (11).

$$H'=Hd-Hj \quad (10)$$

$$T'=Td-Tj \quad (11)$$

H' represents the amount of read hit data among the read data Nr, assuming that the intended write-back data j was not present in the cache memory. In other words, what is here examined is the past hit rate when the data j was not stored in the cache memory. That is why H', T' are substituted in formulae (10), (11) for the Hd, Td of formulae (8), (9).

Formula (6) can now be rearranged with the aid of formulae (7), (8), (9). If Sj represents S as sought in relation to the data j, the following formula (12) is adduced.

$$Sj'\ Nd=H'\ M+(Nr-H')L+T'\ M+(Nw-T)LM(W0+|Cj-Ci|Wm) \quad (12)$$

Here, Ci represents the cylinder number for the last storage read location, while Cj represents the cylinder number for the read location of the data j. |Cj−Ci| is the absolute value of the difference between the two. This formula (12) assesses the data j as write-back data. That is to say, it shows the degree to which the data j is suitable as write-back data.

Sj' Nd on the left-hand side of formula (12) is replaced with Sj" as below, and this Sj" is the assessment value of the data j.

$$Sj"=Sj'\ Nd \quad (13)$$

If assessment values as write-back data for other items of data in the cache memory are adduced in the same way as for the data j, and the item with the smallest assessment value is selected from among all the data, it follows that this item is the most suitable as write-back data.

It is possible to calculate formula (12) for each item of data in the cache memory at the time of write-back, but the volume of calculations is relatively large. The following is a way of reducing this volume of calculations.

Firstly, formulae (10), (11) are used to extract from formula (12) only those items which do not depend on the data j, and this is replaced by Sd as follows.

$$Sd=Hd\ M+(Nr-Hd)L+Td\ M+(Nw-Td)L\ M\ W0 \quad (14)$$

Incorporating formula (14) into formula (12) and rearranging produces the following formula.

$$Sj"=Sd-Hj\ M+Hj\ L-Tj\ M+Tj\ L\ M\ W0+(Nw-Td+Tj)L\ M(|Cj-Ci|Wm) \quad (15)$$

Here, the first item Sd on the right-hand side of formula (15) is the initial value of Sj", and can be determined in advance when the data j is written to the cache memory. The values of the second to fifth items are established when Hj, Tj are updated. Rearranging the first to fifth items on the right-hand side of formula (15) yields the following formula.

$$Sj=Sd+Hj(L-M)+Tj\ M(L\ W0-1) \quad (16)$$

Rearranging the constant items in formula (16) produces the following formulae.

$$Sj = Sd + Hj\ L' + Tj\ M' \quad (17)$$

$$L' = (L-M) \quad (18)$$

$$M' = M(L\ W0 - 1) \quad (19)$$

Here, Sj in formula (16) may be referred to as the hit performance value of the date j. The initial value of the hit performance value Sj is Sd, and is thereafter updated wherever there is a read hit or write hit in the cache memory for the data j, namely whenever Hj, Tj change. Since the amount by which Hj, Tj change on update is the same as the unit data length d0, Sj may be updated as follows.

At write hit $$Sj \leftarrow Sj + M'\ d0$$

At read hit $$Sj \leftarrow Sj + L'\ d0$$

At write miss, read miss $$Sj \leftarrow Sj\ (\text{no update}) \quad (20)$$

Since L, M, Wm In the sixth item on the tight-hand side of formula (15) are constants, it may be summarised as follows.

$$Wz = L\ M \quad (21)$$

Combining formulae (16)–(19), (21) into formula (15) and rearranging yields the following formula.

$$Sj'' = Sj + (Nw - Td + Tj)|(Cj - Ci|Wz \quad (22)$$

At write-back, Si" or formula (22) may be determined for the data j in the cache memory, as may Sl" of formula (22) for all the other items of data l in the cache memory, and the smallest selected as write-back data.

In the above description, the total number of read requests Nr from the host, the total number of read hits Hd among them, the total number of write requests Nw from the host, the total number of write hits Td among them, the total number of read hits Hj for each item of data present in the cache memory, and the total number of write hits Tj have been measured as information on the use status of the cache memory each time the total number of read/write requests from the host reached a predetermined value Nd. However, it is also possible to measure the total number of read/write requests from the host Nd, the total number of read requests Nr from the host, the total number of read hits Hd among them, the total number of write requests Nw from the host, the total number of write hits Td among them, the total number of read hits Hj for each item of data present in the cache memory, and the total number of write hits Tj as information on the use status of the cache memory each time a certain fixed amount of time elapses.

Moreover, if the size of the data for each read request or write request, the size of the data in the cache memory, and the size of the data transfer between the storage control device and the storage are all the same, it is possible to read 'frequency' for 'total number' in each instance in the above description.

In such a case, the amount of each request from the host, the size of data blocks in the cache memory 12, and the size of data read to or written from the magnetic storage are all the same size d0.

When all the data blocks in the cache memory 12 are in use, and there are no vacant ones, it becomes impossible to store any new data in the cache memory 12 at read miss or write miss. In order to avoid this, when there are no vacant data blocks at all in the cache memory 12, or when the number of vacant data blocks falls below a certain level, the data which has been stored in one of the data blocks in the cache memory 12 is written back to the storage 10 in order to vacate a block. At this time, the question of which data block is selected to have its data written back is determined by the control device 11 with the aid of data for use in selecting write-back data This data for use in selecting write-back data comprises a cache hit rate control table 13 which is located within the cache memory 12, a storage last read/write location pointer 110 which is located within the storage 11, a transfer data counter 114, and a cache hit rate control table bank selector 115.

Figure 2:
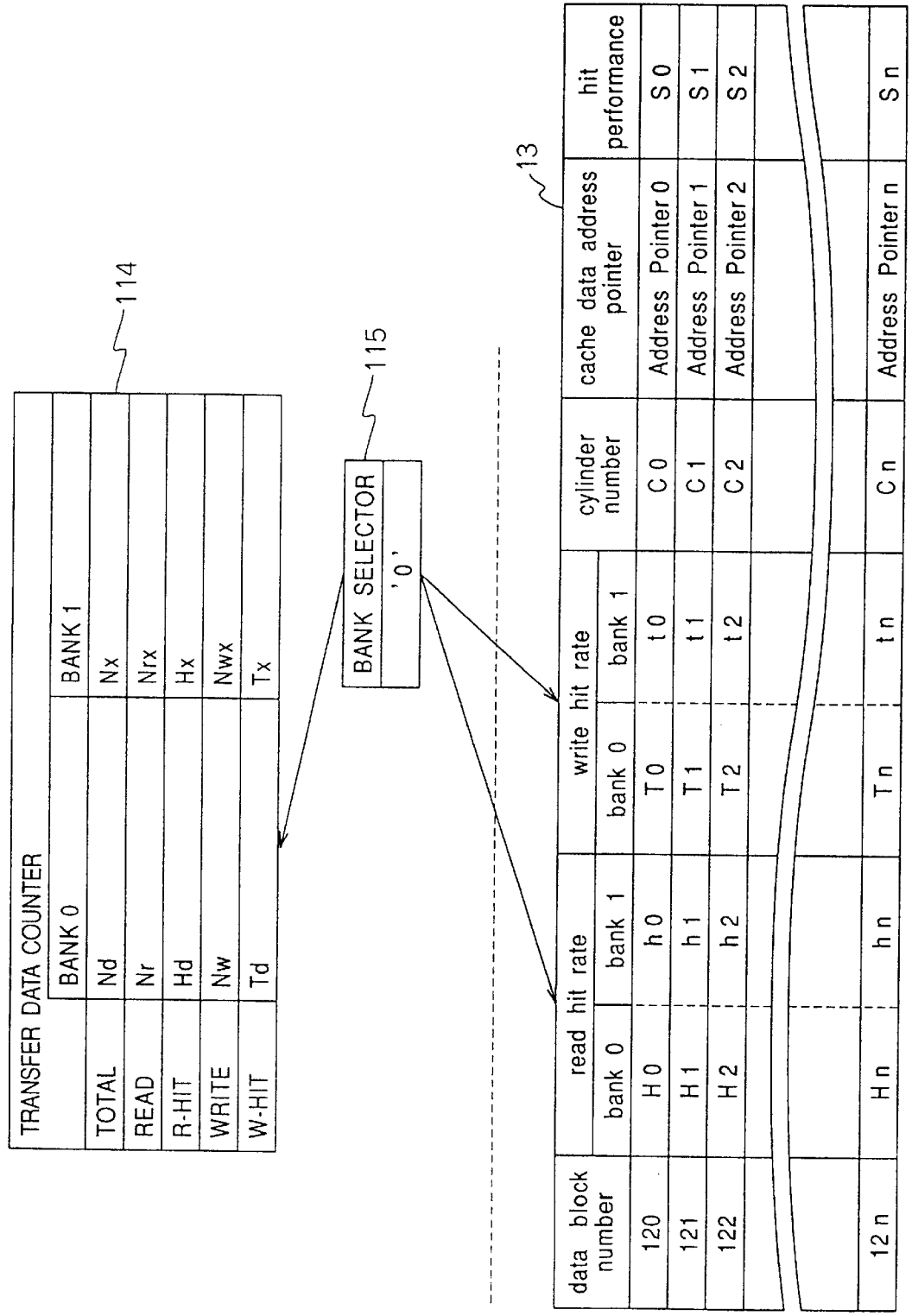
FIG. 2 illustrates an example of the structure of a cache hit rate control table, transfer data counter, and cache hit rate control table bank selector.

Examples of configurations of the cache hit rate control table 13, transfer data counter 114 and cache hit rate control table bank selector 115 are illustrated in FIG. 2.

(Transfer data counter)

As illustrated in FIG. 2, the transfer data counter 114 has five entries, namely TOTAL, READ, R-HIT, WRITE and W-HIT. Each entry is divided into bank 0 and bank 1. The two banks 0, 1 are used alternately for holding data which is in the process of being measured and the results of the data last measured. In other words, when data which is in the process of being measured is held in bank 0, the results of the measurements immediately preceding it are held in bank 1. When the measurements which are occupying bank 0 have concluded, those results are held in bank 0, and fresh measurements are executed using bank 1. In FIG. 2, the results of the previous measurements are held in bank 0 while fresh measurements are currently in the process of being executed using bank 1. Data is stored in the respective entries as follows.

In the entry TOTAL are stored the results of measurements of the total number of read/write requests Nd from the host, together with the value Nx which is in the process of being measured. Bank switching occurs when the value Nx which is in the process of being measured attains the value Nd.

In the entry READ are stored the results of measurements of that part of the total number of read/write requests Nd from the host which comprises the total number of read requests Nr, along with the value Nrx representing that part of the total number of read/write requests Nx in the process of being measured which comprises the read requests in the process of being measured.

In the entry R-HIT are stored the results of measurements of that part of the total number of read requests Nr which comprises the total number of read hits Hd, together with the value Hx representing that part of the total number of read requests Nrx in the process of being measured which comprises the total number of read hits.

In the entry WRITE are stored the results of measurements of that part of the total number of read/write requests Nd from the host which comprises the total number of write requests Nw, along with the value Nwx representing that part of the total number of read/write requests Nx in the process of being measured which comprises the write requests in the process of being measured.

In the entry W-HIT are stored the results of measurements of that part of the total number of write requests Nw which comprises the total number of write hits Td, together with the value Tx representing that part of the total number of write requests Nwx in the process of being measured which comprises the total number of write hits.

(Cache hit rate control table)

As is shown in FIG. 2, the cache hit rate control table 13 has entries corresponding one for one to the data blocks 120–12n which are present in the cache memory 12. Each of the entries comprises the items 'data block number', 'read hit rate', 'write hit rate', 'cylinder number', 'cache data address pointer' and 'hit performance'. The items 'read hit rate' and 'write hit rate' are divided into bank 0 and bank 1. The two banks 0, 1 are used alternately for holding data which is in the process of being measured and the results of the data last measured, in the same way as with the transfer data counter 114. Data is stored in the respective entries as follows.

In the item 'data block number' are stored in advance the numbers of the data blocks 120–12n.

In the item 'read hit rate' are stored, when there is data stored in the relevant data block, the results H0–Hn of the measurements of the total number of read hits to the relevant data block from among the total number Nd of read/write requests from the host, along pith the values h0–hn within the measurements of the total number of read hits to the relevant data block from among the total number Nx of read/write requests from the host. This is '0' where no data is stored in the relevant data block.

In the item 'write hit rate' are stored, when there is data stored in the relevant data block, the results T0–Tn of the measurements of the total number of write hits to the relevant data block from among the total number Nd of read/write requests from the host, along with the values t0–tn within the measurements of the total number of write hits to the relevant data block from among the total number Nx of read/write requests from the host. This is '0' where no data is stored in the relevant data block.

In the item 'cylinder number' is stored, when there is data stored in the relevant data block, the number C0–Cn of the cylinder in the storage 10 to which that data has been written. This is ' ' (null) where nc data is stored in the relevant data block.

In the item 'cache data address pointer' is stored, when there is data stored in the relevant data block, a pointer showing the location of that data in the cache memory 12.

This is ' ' (null) where no data is stored in the relevant data block.

In the item 'hit performance' is stored, when there is data stored in the relevant data block, the hit performance value S0–Sn as explained elsewhere in this invention. This is '0' where no data is stored in the relevant data block.

The cache hit rate control table bank selector 115 serves to switch between the banks 0, 1 of the transfer data counter 114, and the between the banks 0, 1 of the cache hit rate control table 13. As has already been explained, switching between the banks is implemented when the value Nx which is in the process of being measured attains the value Nd.

Figure 3:
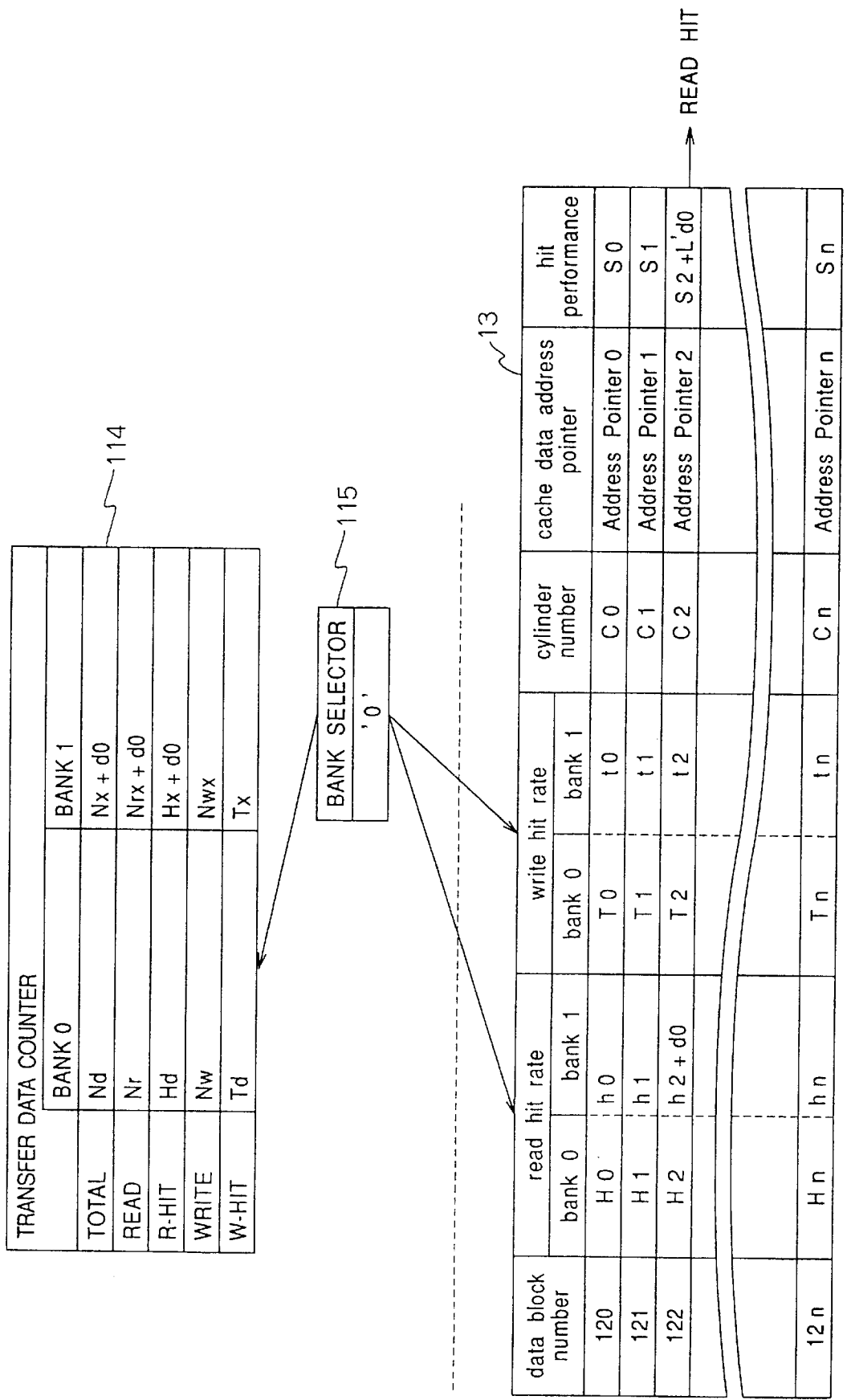
FIG. 3 illustrates an example of the renewed status of the cache hit rate control table, transfer data counter, and cache hit rate control table bank selector at read hit.
Figure 4:
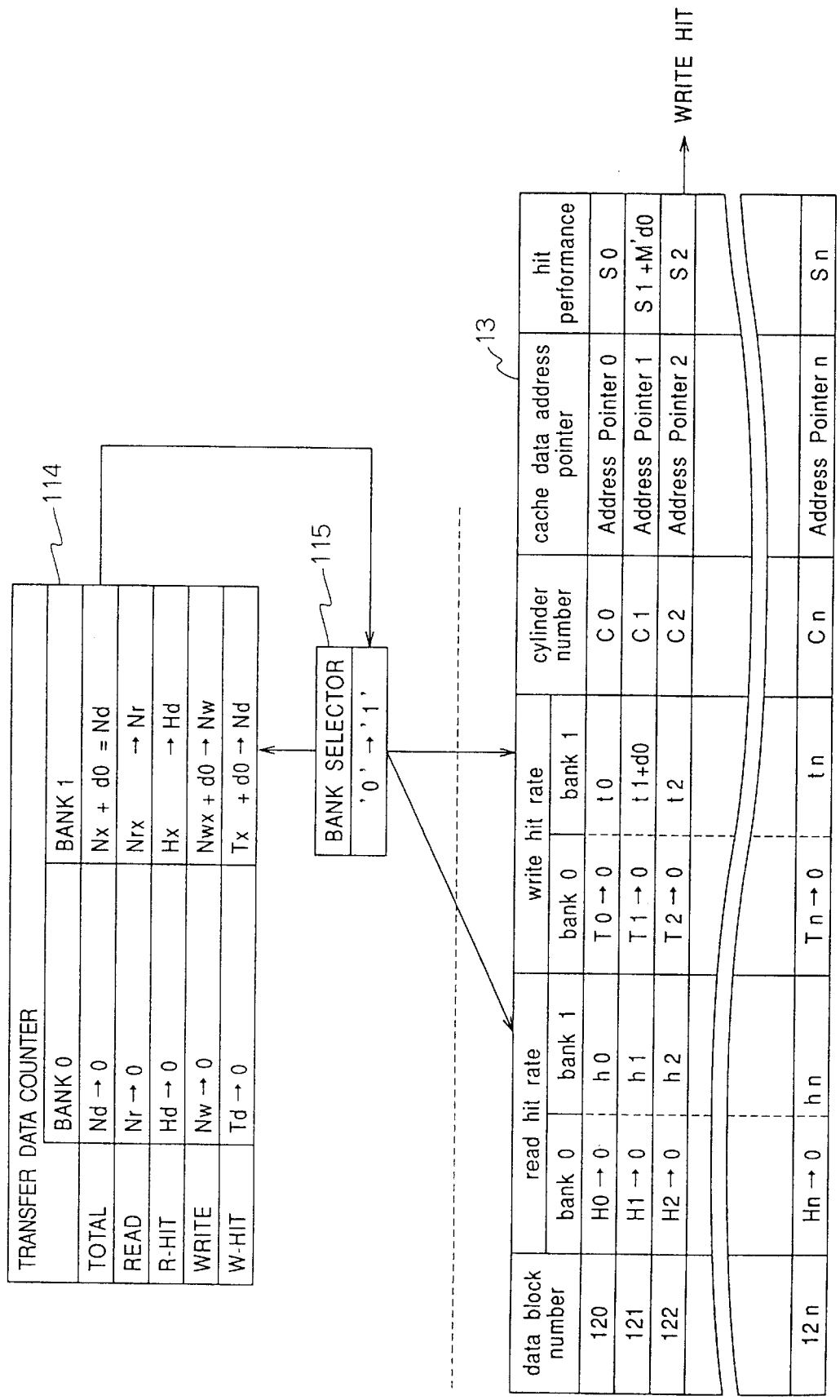
FIG. 4 illustrates an example of the updated states of the cache hit rate control table, transfer data counter, and cache hit rate control table bank selector at write hit, and at read hit where bank switching has been implemented.
Figure 5:
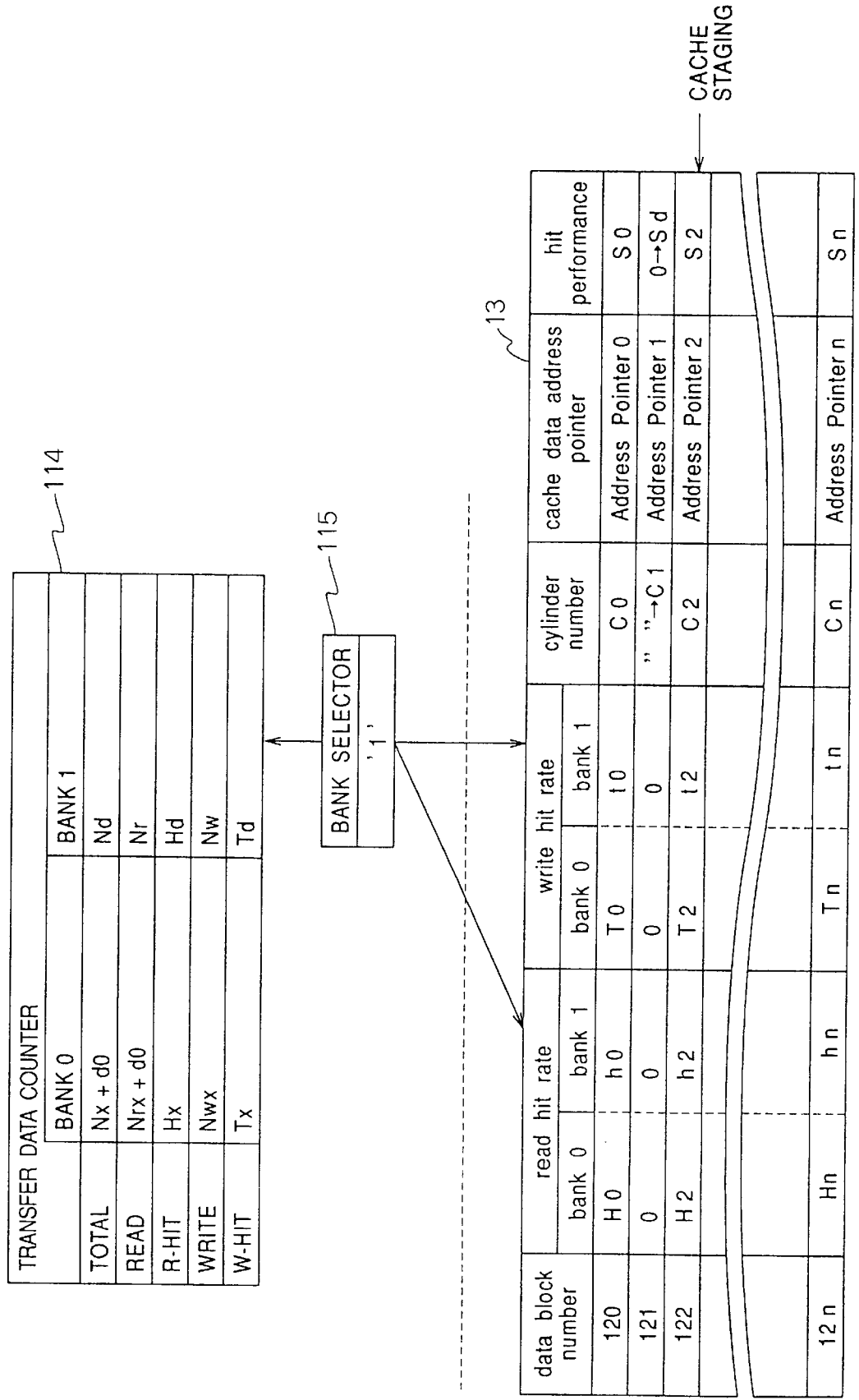
FIG. 5 illustrates an example of the updated status of the cache hit rate control table, transfer data counter, and cache hit rate control table bank selector at read miss.
Figure 6:
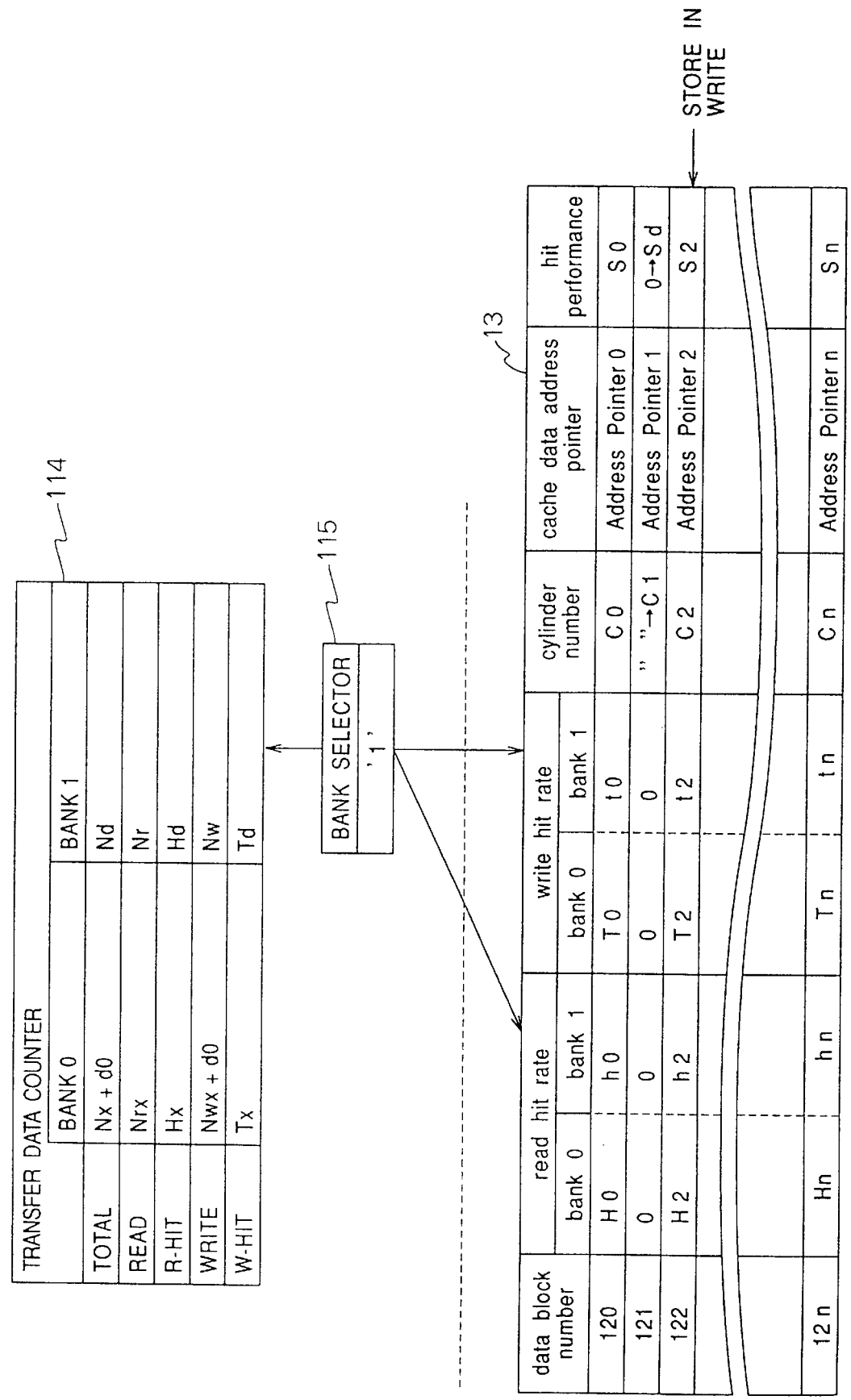
FIG. 6 illustrates an example of the updated status of the cache hit rate control table, transfer data counter, and cache hit rate control table bank selector at write miss.
Figure 7:
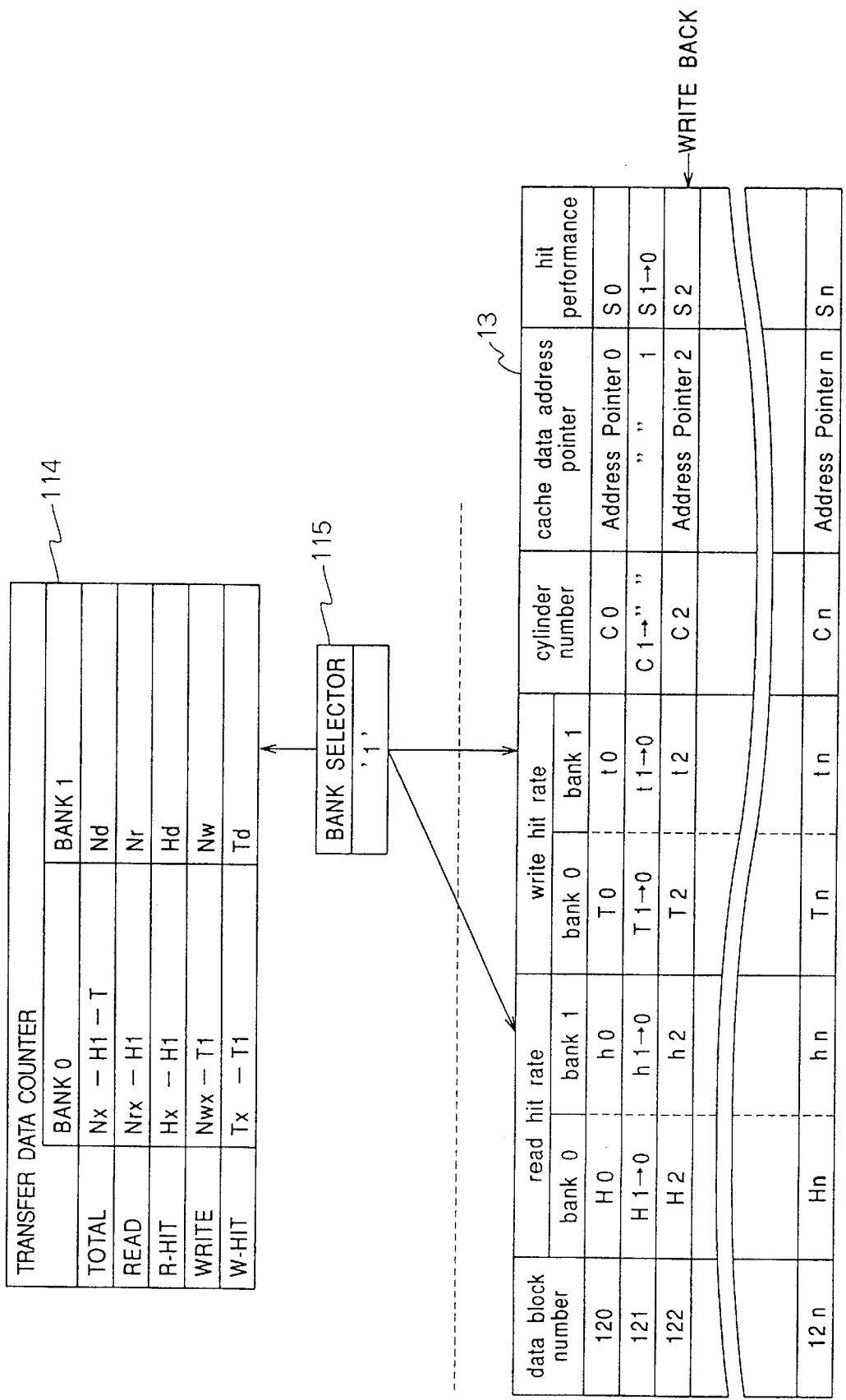
FIG. 7 illustrates an example of the updated status of the cache hit rate control table, transfer data counter, and cache hit rate control table bank selector at write-back.

FIGS. 3–7 illustrate how the contents of the cache hit rate control table 13, transfer data counter 114 and cache hit rate control table bank selector 115 are updated, FIG. 3 at read hit, FIG. 4 at write hit and where bank switching has been implemented, FIG. 5 at read miss, FIG. 6 at write miss, and FIG. 7 at write-back.

(Action of reading/writing data)

Figure 8:
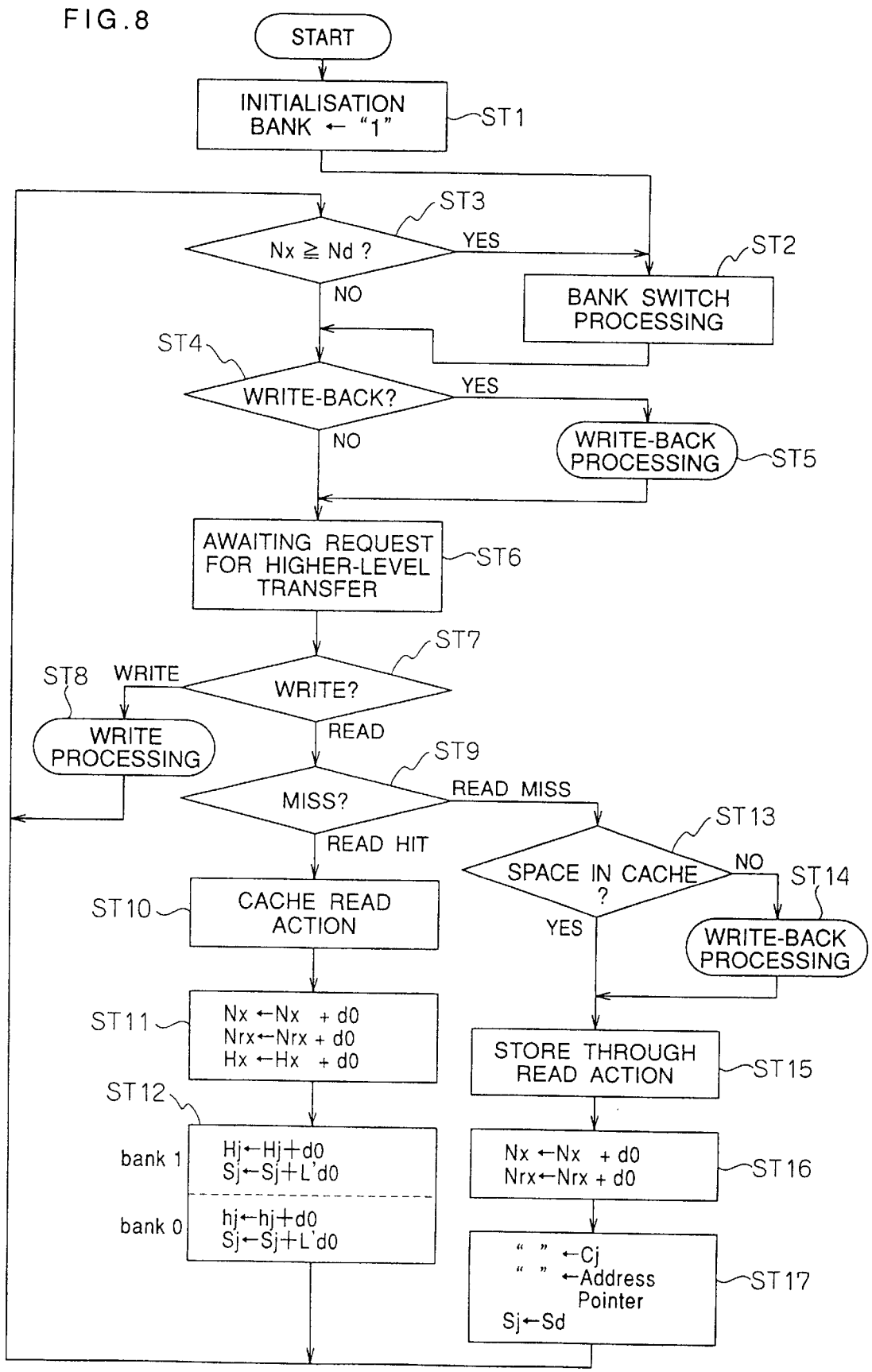
FIG. 8 is a flowchart which illustrates an example of processing of the control mechanism.
Figure 9:
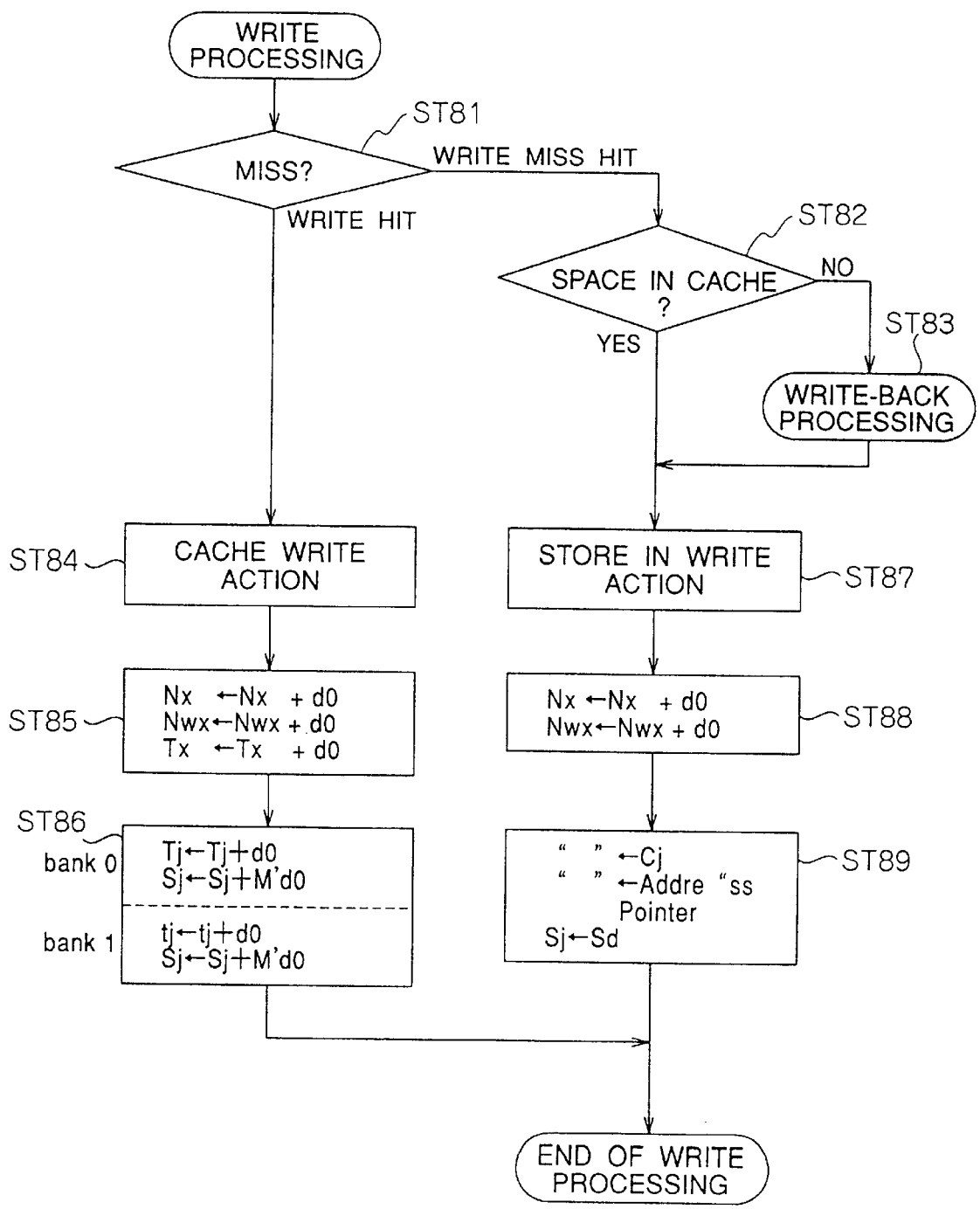
FIG. 9 is a flowchart which illustrates an example of write processing.
Figure 10:
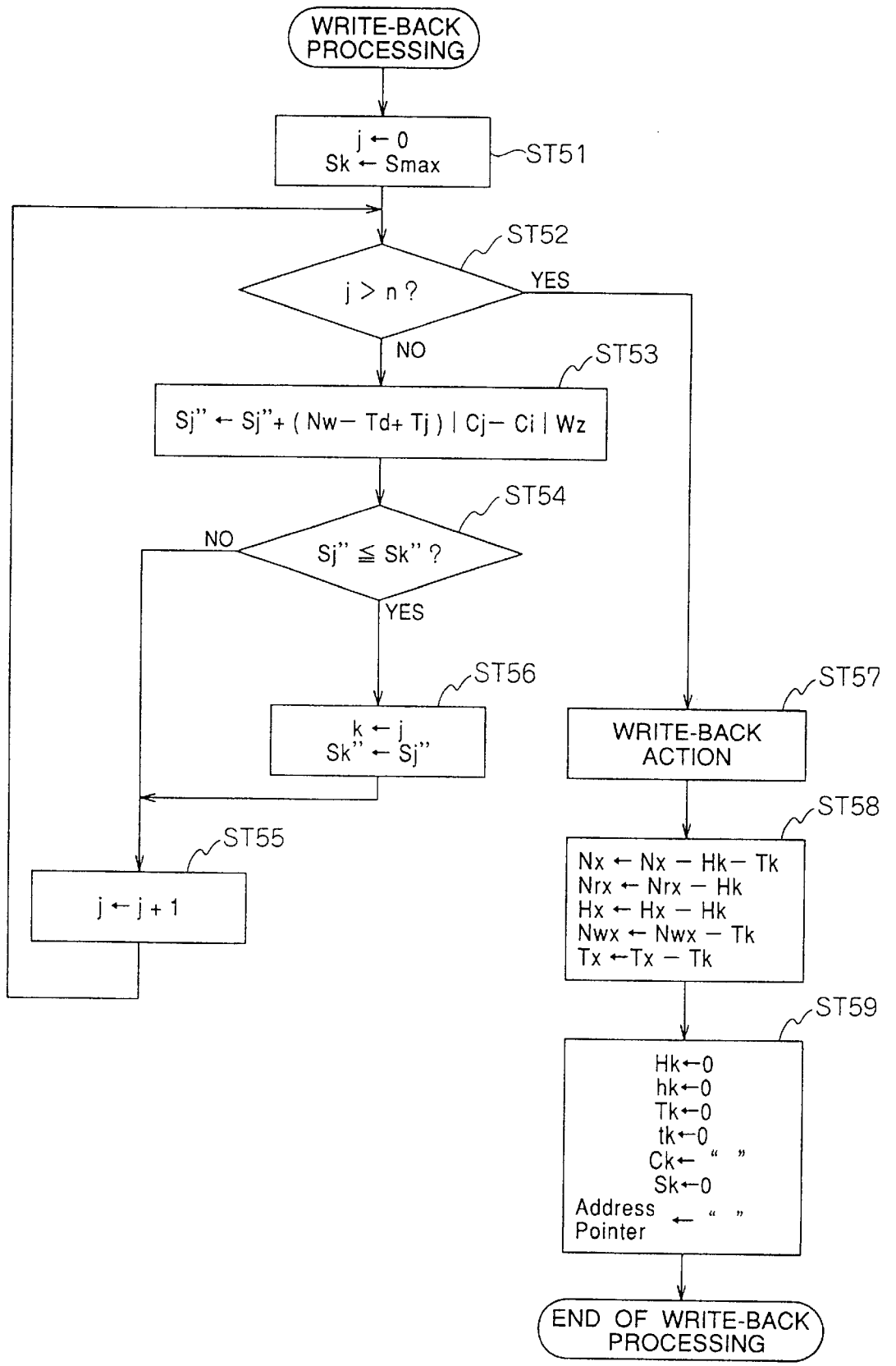
FIG. 10 is a flowchart which illustrates an example of write-back processing.

FIG. 8 is a flowchart illustrating an example of processing by the control mechanism 11; FIG. 9 is a flowchart illustrating an example of write processing at ST 8 of FIG. 8; and FIG. 10 is a flowchart illustrating an example of write-back processing at ST 5, ST 14 of FIG. 8 and ST 83 of FIG. 9. The program allowing the data processing device which constitutes the control mechanism 11 to execute this processing is stored in the storage medium 20 of FIG. 1. The storage medium 20 may be a magnetic storage, semiconductor memory or other similar medium. The program which is stored in the storage medium 20 is read to the data Processing device which constitutes the control mechanism 11, controls the action of the data processing device, and permits it to execute the processing illustrated in FIGS. 8–10. The control mechanism operates in accordance with this program as various types of calculator, detector, mechanism and means. It is also possible to realise these mechanisms with the aid of theoretical circuits without relying on the program.

In the initial state there is not a single copy of data from the storage 10 in the cache memory 12, and all the data blocks 120–12n are vacant. Activation of the control mechanism 11 causes the processing illustrated in FIG. 8 to commence. First, the cache hit rate control table 13, transfer data counter 114, cache hit rate control table bank selector 115 and storage last read/write position pointer 110 are initialised. The cache hit rate control table bank selector 115 is set to '1', and bank 1 of the transfer data counter 114 and cache hit rate control table 13 is set for use in calculating (Step 1). The program then proceeds to bank switch processing ST 2.

This bank switch processing ST 2 is shown in formula (14). Processing is executed in order to determine the initial hit performance value Sd. As a result of this bank switch processing at start-up, bank 0 becomes the initial bank for use in calculating. Since the data for determining the initial value Sd has not yet been calculated, a suitable value is adopted.

Thereafter the control mechanism 11 repeatedly executes a loop comprising ST 3–ST 17.

At ST 4, the data in the cache memory 12 is assessed tc determine whether or not it needs to be written back. This assessment is implemented, for instance, by examining the number of vacant data blocks in the cache memory 12 with reference to the cache hit rate control table 13 to determine whether or not it is below a certain level. If write-back proves necessary, the program proceeds to ST 5, and write-back processing is executed as in FIG. 10.

At ST 6, the program waits for transfer requests, which is to say data read requests (read requests) and data write requests (write requests), from the host. If there is a request from the host, at ST 7 the program differentiates between read requests and write requests. In the case of a write request, the program proceeds to ST 8 and executes write processing as in FIG. 9. In the case of a read request, the processing described below in ST 9–ST 17 is executed. First, it examines whether or not there has been a read hit in the cache memory 12 (ST 9). If there has been a read hit, it executes the action of cache read (SL 10). That is to say, it uses the cache hit transfer bus 112 to transfer the relevant data from the cache memory 12 by way of the higher level connection bus 101 to the host. At this stage it performs ST 11, and augments Nx (total number of read/write requests from the host), Nrx (total number of read requests from the host) and Hx (total number of read hits), which are in the process of being calculated by the transfer data counter 114, by the unit data length d0. It then performs ST 12, augmenting by the unit date length do the total number of read hits of the data block within the cache hit rate control table 13 in which the relevant item of data is stored, and also augmenting the cache hit performance value of the relevant data by L' d0. FIG. 3 illustrates the action of ST 11, ST 12 following a read hit in data block 122. Nx, Nrx, Hx in bank 1 of the transfer data counter 114 are augmented by d0, as is h2 in bank 1 of the entry corresponding to data block 122 in the cache hit rate control table 13, while the hit performance value S2 is augmented by L' d0.

In the case of a read miss, the program checks whether or not there is a vacant data block ir, the cache memory 12 (ST 13).

If there is not, it executes the write-back processing illustrated in FIG. 10 as ST 14, and then proceeds to ST 15.

If there is, it proceeds directly to ST 15.

At ST 15 it performs a store-through-read action. In other words, it uses the cache hit transfer bus 111 to read the relevant data from the storage 10 by way of the lower level connection bus 102 (updating the storage last read/write location pointer 110). It then stores this in the vacant data block in the cache memory 12, and also transfers it by way of the higher level connection bus 101 to the host. At this stage it performs ST 16, and augments Nx (total number of read/write requests from the host) and Nrx (total number of read requests from the host), which are in the process of being calculated by the transfer data counter 114, by the unit data length d0. It then performs ST 17, setting the cylinder number Cj for that item of data in the storage 10, the address pointed showing its location in the cache memory 12, and the initial value Sd of the hit performance value Sj in the data block within the cache hit rate control table 13 in which the relevant item of data is stores. FIG. 5 illustrates the action of ST 16, ST 17 where the data has seen read and cached in data block 121. Nx, Nrx in bank 0 in the transfer data counter 114 have been augmented by d0, and C1, address pointer, Sd have been set in bank 0 of the entry in the cache rate control table 13 which corresponds to data block 121.

Write processing at ST 8 is implemented in the following manner (cf. FIG. 9).

First, the program examines whether or not there has been a write hit in the cache memory 12 (ST 81). If there has been a write hit, it executes the action of cache write (ST 84). That is to say, it uses the cache hit transfer bus 112 to write the write data to the relevant data block, and notifies the host when the write process is complete. At this stage it performs ST 85, and augments Nx (total number of read/write requests from the host), Nwx (total number of write requests from the host) and Tx (total number of wrote hits), which are in the process of being calculated by the transfer data counter 114, by the unit data length d0. It then performs ST 86, augmenting by the unit data Length d0 the total number of write hits of the data block within the cache hit rate control table 13 in which the relevant item of data is stored, and also augmenting the cache hit performance value of the relevant data by M' d0 in accordance with formula (20). FIG. 4 illustrates the action of ST 85, ST 86 following a write hit in data block 121. Nx, Nwx, Tx in bank 1 of the transfer data counter 114 are augmented by d0, as is t1 in bank 1 of the entry corresponding to data block 121 in the cache hit rate control table 13, while the hit performance value S1 is augmented by M' d0. it should be pointed out that FIG. 4 also illustrates the action accompanying bank switch because it assumes that the value of Nx after augmentation has attained the predetermined value Nd. This will be explained later.

In the case of a write miss, the program checks whether or not there is a vacant data block in the cache memory 12 (ST 82). If there is not, it executes the write-back processing illustrated in FIG. 10 as ST 83, and then proceeds to ST 87.

If there is, it proceeds directly to ST 87.

At ST 87 it performs a store-in-write action. In other words, it uses the cache hit transfer bus 112 to write the relevant data to a vacant data block in the cache memory 12, and notifies the host when the write process is complete. At this stage it performs ST 88, and augments Nx (total number of read/write requests from the host) and Nwx (total number of write requests from the host), which are in the process of being calculated by the transfer data counter 114, by the unit data length d0. It then performs ST 89, setting the cylinder number Cj for that item of data in the storage 10, the address pointer showing its location in the cache memory 12, and the initial value Sd of the hit performance value Sj in the data block within the cache hit rate control table 13 in which the relevant item of data is stored. FIG. 6 illustrates the action of ST 88, ST 89 where the data has been written and cached in data block 121. Nx, Nwx in bank 0 in the transfer data counter 114 have been augmented by d0, and C1, address pointer, Sd have been set in bank 0 of the entry in the cache rate control table 13 which corresponds to data block 121.

There follows an explanation of the write-back processing executed at ST 5, ST 14 in FIG. 8, and ST 83 in FIG. 9 (cf. FIG. 10).

First, the variable j is initialised, and the variable Sk" set to its maximum value Smax. Next, the loop formed by ST 52–ST 56 is repeated so as to select from among all the data which is present in the cache memory 12 the item of data for which the value of Sj" in formula (22) is smallest. This becomes the write-back data. In other words, $$S0''=S0+(Nw-Td+T0)|C0-Ci|Wz$$

$$S1''=S1+(Nw-Td+T1)|C1-Ci|Wz$$

$$\ldots$$

$$Sn''=Sn+(Nw-Td+Tn)|Cn-Ci|Wz$$

are calculated to determine the value of j when it is smallest. This is then applied to the variable k. Here, S0–Sn is the hit performance value of the relevant data in the cache hit rate control table 13, Nw, Td are the total numbers of write data items and write hits in the bank within the transfer data counter 114 in which the results of the last calculations are held, T0–Tn is the total number of write hits for the relevant data stored in the bank within the cache hit rate control table 13 in which the results of the last calculations are held, C0–Cn is the cylinder number in the storage 10 for the relevant data within the cache hit rate control cable 13, and Ci is the cylinder number of the last read/write location in the storage 10 as stored in the storage last read/write location pointer 110.

Once the write-back data is determined, it is written to the storage 10 in ST 57, and the storage last read/write location pointer 110 is updated. Then ST 58 is implemented, and the details which are in the process of being calculated in the transfer data counter 114 are each decremented by the amount of the write-back data. That is to say, Nx (the total number of read/write requests from the host) is decremented by the total number of read hits Hk and write hits Tk in the write-back data, Nix (the total number of read requests from the host) and Hx (the total number of read hits) are decremented by the total number of read hits Hk in the write-back data, and Nwx (the total number of write requests from the host) and Tx (the total number of write hits) are decremented by the total number of write hits Tk in the write-back data. Next, ST 59 is implemented, and the data block in which the write-back data has been stored is initialised. In other words, Hk, hk, Tk, tk become 0, while the cylinder number Ck, address pointer become null.

FIG. 7 illustrates the actions of ST 58, 59 where data which was stored in data block 121 has been written back, and Nx within the transfer data counter 114 decremented by H1, T1, while Nrx, Hx have been decremented by H1, and Nwx, Tx by T1. Similarly, Hk, hk, Tk, tk of data block 121 in the cache hit rate table 13 have become 0, while the cylinder number Ck, address pointer have become null.

There follows an explanation of the action at the time of bank switching.

Nx in the bank of the transfer data counter 114 which is being used for calculation is updated as a result of a data read/write request from the host. When it attains Nd (ST 3 in FIG. 8), the program proceeds to ST 2, and bank switch processing is executed. FIG. 4 shows how Nx has attained Nd as a result being updated at write hit. Needless to say, Nx may also attain Nd at write miss, read hit or read miss, in which case bank switching is implemented.

As FIG. 4 shows, if the value of Nx attains Nd while bank 1 is being used for the purpose of calculation, Nd, Nr, Hd, Nw, Td in bank 0 of the transfer data table 114 are all initialised to '0' in order that bank 0 may be used for the purpose of calculation. Similarly, in order for bank 0 of 'read hit rate' and 'write hit rate' in the cache hit rate Control table 13 to be used for the purpose of calculation, H0–Hn, T0–Tn are a initialised to '0'. Moreover, the value of the cache hit control bank selector 115 is altered from 0 to 1, and the initial hit performance value Sd of formula (14) is calculated and kept using the values of bank 1. Thereafter, so long as the value of the cache hit control bank selector 115 is 1, its values are used for calculating formulae (20), (22).

The above is a description of an embodiment of the present invention, which is nevertheless in no way restricted to the above embodiment, and may be augmented and modified in various ways. For instance, it is possible to provide a flag in each data block in the cache memory 12 to show whether or not the data stored there has been updated, so that only updated data is the object of write-back. It is also possible to clear those data blocks which have not been updated even once, so as to ensure that there is a vacant data block. In this case, the transfer data counter 114 and cache hit rate control table 13 are updated simultaneously with write-back.

As has been described above, the present invention, by selecting as write-back data such data as on the basis of the most recent write hit or read hit status of data in the cache memory, data on the use status of the cache memory including the read hit status, and the read/write location in the storage and last storage read/write location for each item of data in the cache memory has the greatest expected value thereafter for the mean data transfer rate with the host, makes it possible to improve the performance of the storage control device of the write-back system.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-116133 (Filed on Apr. 18th, 1997) including specification, claims, drawings and summary are incorporated herein by reference in its entirety

What is claimed is:

1. A device for the write-back of data stored within a cache memory connected to a storage, comprising:

a use rate calculator which serves to calculate a read hit rate and a write hit rate of each item of data stored in the cache memory;

a location detector which specifies the intended location in the storage for each item of data stored in the cache memory, a head position memory which stores a current position of a recording/reproduction head of the storage;

a distance calculator which serves to calculate a distance between the intended location in the storage for each item of data stored in the cache memory and the current position of the head; and a selector which serves to select write-back data from among data stored in the cache memory in accordance with the read hit rate and the write hit rate and the calculated distance of each item of data.

2. The device according to claim 1, wherein the selector selects write-back data when there has been a cache miss.

3. The device according to claim 1, wherein the use rate calculator calculates the rate of use of the cache for each item of data based on a total frequency of transfer between the storage and a host.

4. A device for the write-back of data stored within a cache memory connected to a storage, comprising:

a use rate calculator which serves to calculate a rate of use of each item of data stored in the cache memory;

a location detector which specifies the intended location in the storage for each item of data stored in the cache memory, a head position memory which stores a current position of a recording/reproduction head of the storage;

a distance calculator which serves to calculate a distance between the intended location in the storage for each item of data stored in the cache memory and the current position of the head; and a selector which serves to select write-back data from among data stored in the cache memory in accordance with the rate of use and the calculated distance of each item of data, wherein the selector includes a calculation mechanism which serves to calculate a predicted data transfer rate for each item of write-back data, and a selection mechanism which serves to select as write-back data such data as has a longest predicted data transfer time.

5. A device for the write-back of data stored within a cache memory connected to a storage, comprising:

a use rate calculator which serves to calculate a rate of use of each item of data stored in the cache memory;

a location detector which specifies the intended location in the storage for each item of data stored in the cache memory, a head position memory which stores a current position of a recording/reproduction head of the storage;

a distance calculator which serves to calculate a distance between the intended location in the storage for each item of data stored in the cache memory and the current position of the head; and a selector which serves to select write-back data from among data stored in the cache memory in accordance with the rate of use and the calculated distance of each item of data, wherein the use rate calculator calculates the rate of use of the cache for each item of data based on a total amount of data transferred between the storage and a host.

6. A device for the write-back of data stored within a cache memory connected to a storage, comprising:

a use rate calculator which serves to calculate a rate of use of each item of data stored in the cache memory;

a location detector which specifies the intended location in the storage for each item of data stored in the cache memory, a head position memory which stores a current position of a recording/reproduction head of the storage;

a distance calculator which serves to calculate a distance between the intended location in the storage for each item of data stored in the cache memory and the current position of the head; and a selector which serves to select write-back data from among data stored in the cache memory in accordance with the rate of use and the calculated distance of each item of data, wherein the selector includes (A) a use rate calculation mechanism which calculates a virtual rate of use on the basis of (i) an amount of virtual past cache hit data after deleting from a total amount of cache hit data an amount of data which it is sought to write back, and (ii) a total amount of data transferred between a host and the storage, and (B) a selection mechanism which selects write-back data from among such data as causes this virtual rate of use to decrease, the difference between the current position of the head and the store location of said write-back data in the storage as calculated by the distance calculator being small.

7. A device for the write-back of data stored within a cache memory connected to a storage, comprising:

a use rate calculator which serves to calculate a rate of use of each item of data stored in the cache memory;

a location detector which specifies the intended location in the storage for each item of data stored in the cache memory, a head position memory which stores a current position of a recording/reproduction head of the storage;

a distance calculator which serves to calculate a distance between the intended location in the storage for each item of data stored in the cache memory and the current position of the head; and a selector which serves to select write-back data from among data stored in the cache memory in accordance with the rate of use and the calculated distance of each item of data, wherein the selector includes (A) a mechanism which calculates a virtual rate of use on the basis of (i) an amount of virtual past cache hit data after deleting from a total amount of cache hit data an amount of data which it is sought to write back, and (ii) a total amount of data transferred between a host and the storage, (B) a mechanism which calculates a mean data transfer time for write-back of each item of data on the basis of (i) the virtual rate of use, and (ii) a difference between the current position of the head and a store location of said write-back data in the storage as calculated by the distance calculator, and (C) a mechanism which selects as write-back data such of the data within the cache memory as has a longest mean data transfer time.

8. A device for the write-back of data stored within a cache memory connected to a storage, comprising:

means for calculating a read hit rate and a write hit rate of each item of data stored in the cache memory;

means for specifying the intended location in the storage for each item of data stored in the cache memory;

means for storing a current position of the recording/reproduction head of the storage;

means for calculating a distance between the intended location in the storage for each item of data stored in the cache memory and the current position of the head; and means for selecting write-back data from among data stored in the cache memory in accordance with the read hit rate and the write hit rate and the calculated distance of each item of data.

9. A device for the write-back of data stored within a cache memory connected to a storage, comprising:

means for calculating a rate of use of each item of data stored in the cache memory;

means for specifying the intended location in the storage for each item of data stored in the cache memory;

means for storing a current position of the recording/reproduction head of the storage;

means for calculating a distance between the intended location in the storage for each item of data stored in the cache memory and the current position of the head; and means for selecting write-back data from among data stored in the cache memory in accordance with the rate of use and the calculated distance of each item of data, wherein the means for selecting includes means for calculating a predicted data transfer rate for each item of write-back data, and means for selecting as write-back data such data as has a longest predicted data transfer time.

10. A storage control device which connects at least one storage and at least one higher level device, and controls data transfer between said at least one higher level device and said at least one storage, comprising:

a higher level connection bus which is connected to at least one higher-level device;

a low level connection bus which is connected to at least one storage;

a cache miss transfer bus which connects the lower level connection bus and the higher level connection bus, a cache memory which is connected to this cache miss transfer bus;

a cache hit transfer bus which connects the cache memory and the higher level connection bus;

a cache memory write-back transfer bus which connects the cache memory and the storage; and a control mechanism which uses the cache memory to control data transfer between the higher-level device and the storage;

wherein, the control mechanism comprises:

a measurement means which serves to measure as data relating to a use status of the cache memory every time a total number of read/write requests from the higher-level device reaches a predetermined value Nd, (i) a total number of read requests Nr from the higher-level device, (ii) a total number of read hits Hd among them, (iii) a total number of write requests Nw from the higher-level device, (iv) a total number of write hits Td among them, and (v) a total number of read hits Hj and write hits Tj for each item of data which is present in the cache memory;

a calculation means which has for each item of data present in the cache memory an initial value Sd in accordance with the use status of the cache memory as measured immediately before that item of data was written to the cache memory, and serves to calculate a hit performance value Sj which is updated by a specified amount every time there is a read hit or a write hit in relation to that item of data, and a selection means which serves to select write-back data in view of the hit performance value Sj of each item of data present in the cache memory, and a difference between a write location and last read/write location in the storage for each item of data.

11. The device according to claim 10, wherein a cylinder number is used in order to calculate the distance between the write location and last read/write location in the storage for each item of data.

12. The device according to claim 10, wherein a data size is rendered uniform when it is stored in the cache memory.

13. A method for the write-back of data stored within a cache memory in a storage control device having a storage, a cache memory connected to this storage and a control mechanism which uses this cache memory in order to control data transfer between a host and the storage, comprising the steps of:

calculating a read hit rate and a write hit rate of each item of data stored in the cache memory;

specifying an intended location in the storage for each item of data stored in the cache memory;

storing a current position of a recording/reproduction head of the storage;

calculating a distance between the intended location in the storage for each item of data stored in the cache memory and the current position of the head; and selecting write-back data from among data stored in the cache memory in accordance with the read hit rate and the write hit rate and the calculated distance of each item of data.

14. The method according to claim 13, comprising the further processes of calculating a predicted data transfer rate for each item of write-back data, and selecting as write-back data such data as has a longest predicted data transfer time.

15. The method according to claim 13, comprising the further processes of (A) calculating a virtual rate of use on the basis of (i) an amount of virtual past cache hit data after deleting from a total amount of cache hit data an amount of data which it is sought to write back, and (ii) a total amount of data transferred between the host and the storage, and (B) selecting write-back data from among such data as causes this virtual rate of use to decrease, the distance between the current position of the head and the store location of said write-back data in the storage as calculated being small.

16. The method according to claim 13, comprising the further processes of (A) calculating a virtual rate of use on the basis of (i) an amount of virtual past cache hit data after deleting from a total amount of cache hit data an amount of data which it is sought to write back, and (ii) a total amount of data transferred between the host and the storage, (B) calculating a mean data transfer time for write-back of each item of data on the basis of (i) the virtual rate of use, and (ii) a distance between the current position of the head and a store location of said write-back data in the storage as calculated, and (C) selecting as write-back data such of the data within the cache memory as has a longest mean data transfer time.

17. A computer program product stored on a storage medium and designed to control a storage control device, the storage control device having a cache memory connected to a storage, and a control mechanism which uses this cache memory in order to control data transfer between a host and the storage, the computer program causing the storage control device to perform the actions of:

calculating a read hit rate and a write hit rate of each item of data stored in the cache memory;

specifying an intended location in the storage for each item of data stored in the cache memory;

storing a current position of a recording/reproduction head of the storage;

calculating a distance between the intended location in the storage for each item of data stored in the cache memory and the current position of the head; and selecting write-back data from among data stored in the cache memory in accordance with the read hit rate and the write hit rate and the calculated distance of each item of data.

18. The computer program product according to claim 17, the computer program causing the storage control device to perform the further actions of calculating a predicted data transfer rate for each item of write-back data, and selecting as write-back data such data as has a longest predicted data transfer time.

19. The computer program product according to claim 17, the computer program product causing the storage control device to perform the further actions of (A) calculating a virtual rate of use on the basis of (1) an amount of virtual past cache hit data after deleting from a total amount of cache hit data an amount of data which it is sought to write back, and (ii) a total amount of data transferred between the host and the storage, and (B) selecting write-back data from among such data as causes this virtual rate of use to decrease, a distance between the current position of the head and a store location of said write-back data in the storage as calculated being small.

20. The computer program product according to claim 17, the computer program product causing the storage control device to perform the further actions of (A) calculating a virtual rate of use on the basis of (i) an amount of virtual past cache hit data after deleting from a total amount of cache hit data an amount of data which it is sought to write back, and (ii) a total amount of data transferred between the host and the storage, (B) calculating a mean data transfer time for write-back of each item of data on the basis of (i) the virtual rate of use, and (ii) a distance between the current position of the head and a store location of said write-back data in the storage as calculated, and (C) selecting as write-back data the data within the cache memory having a longest mean data transfer time.

21. A data product stored on a storage medium and designed to be accessed from a storage control device, the storage control device having a cache memory connected to a storage, and a control mechanism which uses this cache memory in order to control data transfer between a host and the storage, the data comprising:

a cache hit control table showing a hit rate for each item of data stored in the cache memory, this control table being provided with hit rates and intended storage locations in the storage for each item of data;

a transfer data table showing a total amount of data transferred between the host and the storage;

a pointer showing a last read/write location in the storage; and an item within the cache hit control table which shows a mean data transfer time, the mean data transfer time being calculated on the basis of a total amount of transfer data calculated as write-back data and in accordance with a distance between the last read/write location as pinpointed by the pointer and an intended storage location of the write-back data.

22. A storage control device which connects at least one storage and at least one higher level device and controls data transfer between said at least one higher level device and said at least one storage comprising:

a higher level connection bus which is connected to at least one higher-level device;

a low level connection bus which is connected to at least one storage;

a cache miss transfer bus which connects the lower level connection bus and the higher level connection bus, a cache memory which is connected to this cache miss transfer bus;

a cache hit transfer bus which connects the cache memory and the higher level connection bus;

a cache memory write-back transfer bus which connects the cache memory and the storage; and a control mechanism which uses the cache memory to control data transfer between the higher-level device and the storage;

wherein, the control mechanism comprises:

a measurement unit which serves to measure as data relating to a use status of the cache memory every time a total number of read/write requests from the higher-level device reaches a predetermined value Nd, (i) a total number of read requests Nr from the higher-level device, (ii) a total number of read hits Hd among them, (iii) a total number of write requests Nw from the higher-level device, (iv) a total number of write hits Td among them, and (v) a total number of read hits Hj and write hits Tj for each item of data which is present in the cache memory;

a calculation unit which has for each item of data present in the cache memory an initial value Sd in accordance with the use status of the cache memory as measured immediately before that item of data was written to the cache memory, and serves to calculate a hit performance value Sj which is updated by a specified amount every time there is a read hit or a write hit in relation to that item of data, and a selection unit which serves to select write-back data in view of the hit performance value Sj of each item of data present in the cache memory, and a difference between a write location and last read/write location in the storage for each item of data.

23. The device according to claim 22, wherein a cylinder number is used in order to calculate the distance between the write location and last read/write location in the storage for each item of data.

24. The device according to claim 22, wherein a data size is rendered uniform when it is stored in the cache memory.

* * * * *